United States Patent [19]

Allen et al.

[11] Patent Number: 5,331,722
[45] Date of Patent: Jul. 26, 1994

[54] STRAP TENSIONING SYSTEM

[76] Inventors: Alexander R. Allen; Richard A. Allen; Christopher B. Allen, all of 29 Devens St., Concord, Mass. 01742

[21] Appl. No.: 934,913

[22] Filed: Aug. 25, 1992

Related U.S. Application Data

[63] Continuation-in-part of Ser. No. 801,439, Dec. 2, 1991, abandoned.

[51] Int. Cl.⁵ .............................................. A44B 21/00
[52] U.S. Cl. ................................. 24/68 CD; 24/601.6
[58] Field of Search ...................... 24/298, 300, 68 R; 267/71, 74

[56]    References Cited

U.S. PATENT DOCUMENTS

| | | | |
|---|---|---|---|
| 1,037,589 | 9/1912 | Browning | 267/71 |
| 1,258,102 | 3/1918 | Foster | 267/71 X |
| 1,598,744 | 9/1926 | Potter | 267/71 |
| 2,898,966 | 8/1959 | Machesney | 267/71 X |
| 3,231,950 | 2/1966 | Lummis | 24/300 |

FOREIGN PATENT DOCUMENTS 503236  7/1930  Fed. Rep. of Germany ........ 24/300

Primary Examiner—James R. Brittain
Attorney, Agent, or Firm—Herbert L. Bello

[57]    ABSTRACT

A method and apparatus involving a mounting system for securing a carrier for carrying one or more bicycles on a motor vehicle. The mounting system, which is connected to both the motor vehicle and the carrier, includes a strap and a tensioning assembly that is connected intermediate the ends of the strap. In one embodiment, the tension assembly includes a frame, a slidable member and a compression spring that is positioned between the frame and slidable member. In another embodiment, the tension assembly includes a frame, a slidable member and a tension spring that is positioned between the frame and the slidable member. As the strap is tightened for securing the carrier to the motor vehicle, the tension assembly maintains the strap in tension when the strap would otherwise become slack due to jarring of the carrier.

4 Claims, 5 Drawing Sheets

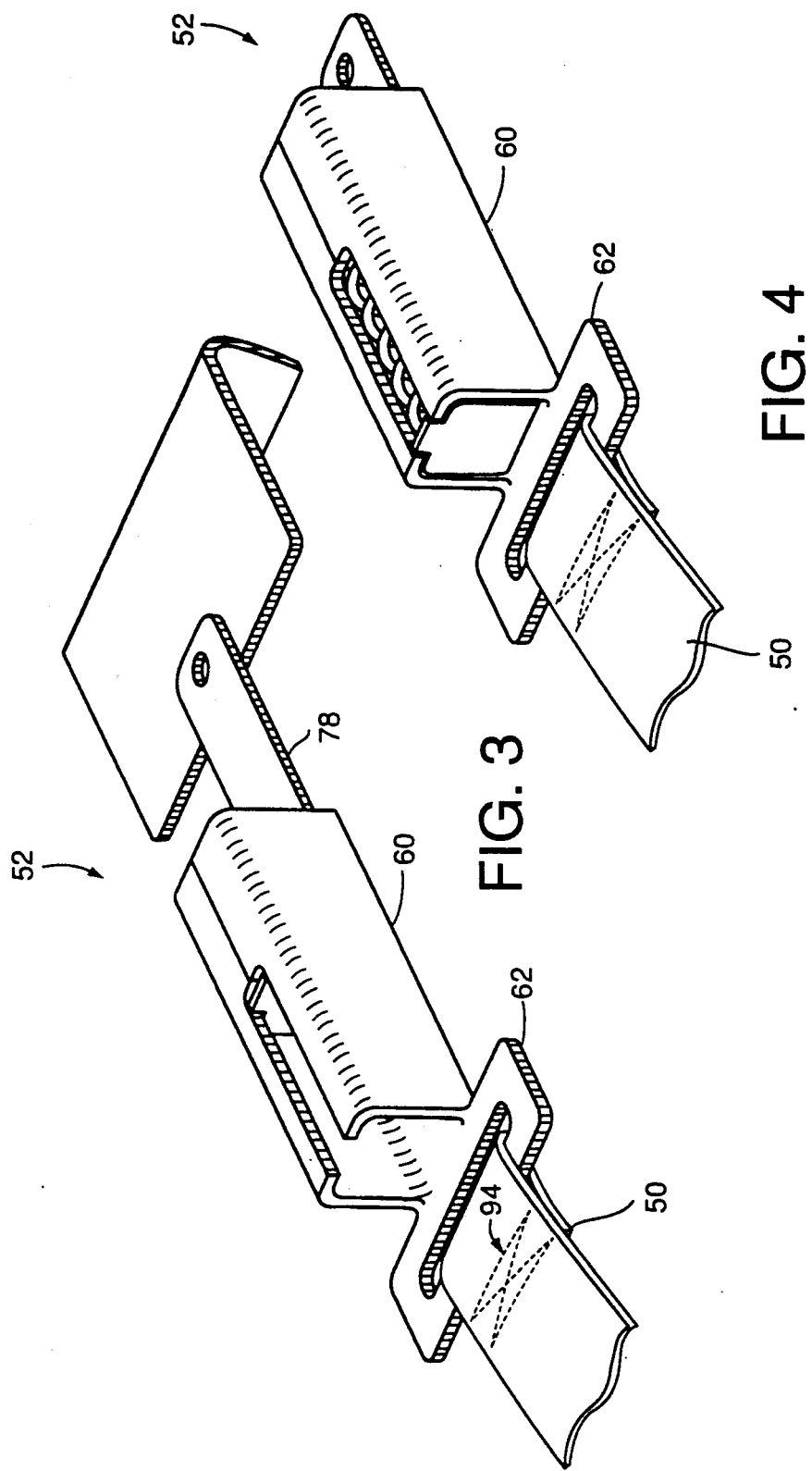

STRAP TENSIONING SYSTEM

CROSS-REFERENCE TO RELATED APPLICATIONS

This is a continuation-in-part of pending application Ser. No. 07/801,439, filed Dec. 2, 1991 abandoned.

BACKGROUND OF THE INVENTION

1. Field of the Invention

The present invention relates to a system for carrying one or more bicycles on a motor vehicle. More particularly, the invention relates to an apparatus and method for securing a bicycle carrier to a motor vehicle.

2. Description of the Prior Art

A variety of bicycle carriers that are configured to be mounted on motor vehicles are available in the prior art. Examples of carriers which are mountable on automobiles are shown in U.S. Pat. Nos. 4,518,108 and 4,709,840.

Generally, bicycle carriers are secured to motor vehicles using a pair of straps, one at each end of the carrier. Typically, one end of each strap is connected to the carrier and the other end is affixed to the motor vehicle using, for example, a hook connected to the strap. Although the use of straps for this purpose is highly effective, it has been observed that the bottom hooks can become disengaged when the top straps are suddenly stretched and relaxed due to jarring of the motor vehicle. Consequently, the carrier becomes disengaged from the motor vehicle and may fall off.

The danger of a carrier falling off a motor vehicle is enhanced when individuals fail to adequately tighten the connecting straps after loading items, for example, bicycles, on the carrier. The need to retighten the straps after loading is not readily apparent because the slackness which occurs as a result of such loading is not always visually discernable. If the strap is loose from the outset, it becomes more likely that the slackness caused by jarring will result in damage to either the bicycle or the motor vehicle or both.

A need has arisen for a system capable of maintaining a tension in a strap while indicating the occurrence of any slackness.

SUMMARY OF THE INVENTION

It is an object of the present invention to provide a mounting system which does not suffer from the foregoing disadvantages and limitations.

It is another object of the present invention to provide an apparatus and method for maintaining tension on straps used to mount a bicycle carrier to a motor vehicle.

The system of the present invention is characterized by a strap means connected to a carrier. The carrier is configured to be mountable on a motor vehicle and carry at least one bicycle. The carrier can include a frame having carrying and supporting members pivotally connected thereto.

The mounting system includes a strap and tension means. The strap has first and second ends and, preferably, is a substantially non-stretchable strap. The tension means includes a frame, a slidable member and a spring. The slidable member is slidably mounted to the frame and constrained for movement relative to the frame between first and second positions. The spring, for example, a compression spring having an expanded or relaxed state and a compressed state, is captively held between the frame and the slidable member. The spring is selected such that it can be compressed when the strap is tightened and, at the same time, be sufficiently strong so that it provides the desired force for maintaining tension on the strap. When the slidable member moves toward the second position, the spring is compressed. When the slidable member moves toward the first position, the spring expands. In operation, after the strap has been tightened and the carrier is secured to the vehicle, the slidable member is near the second position and the spring is compressed. When the carrier is jarred, the strap may tend to become slack. In such a situation, the slidable member moves toward the first position, the spring expands and compensates for any slackness. Thus, the expanding spring maintains the tension on the strap.

Other general and specific objects of the invention will in part be obvious and will in part appear hereinafter.

The invention accordingly comprises the steps and apparatus embodying features of construction, combinations of elements and arrangements of parts adapted to effect such steps, as exemplified in the following detailed disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings wherein:

FIG. 3 is a perspective view of the mounting system of FIG. 1 with the tension means in its compressed state;

FIG. 4 is a perspective view of the mounting system of FIG. 1 with the tension means in its expanded or relaxed state;

DETAILED DESCRIPTION OF THE PREFERRED EMBODIMENTS

Figure 1:
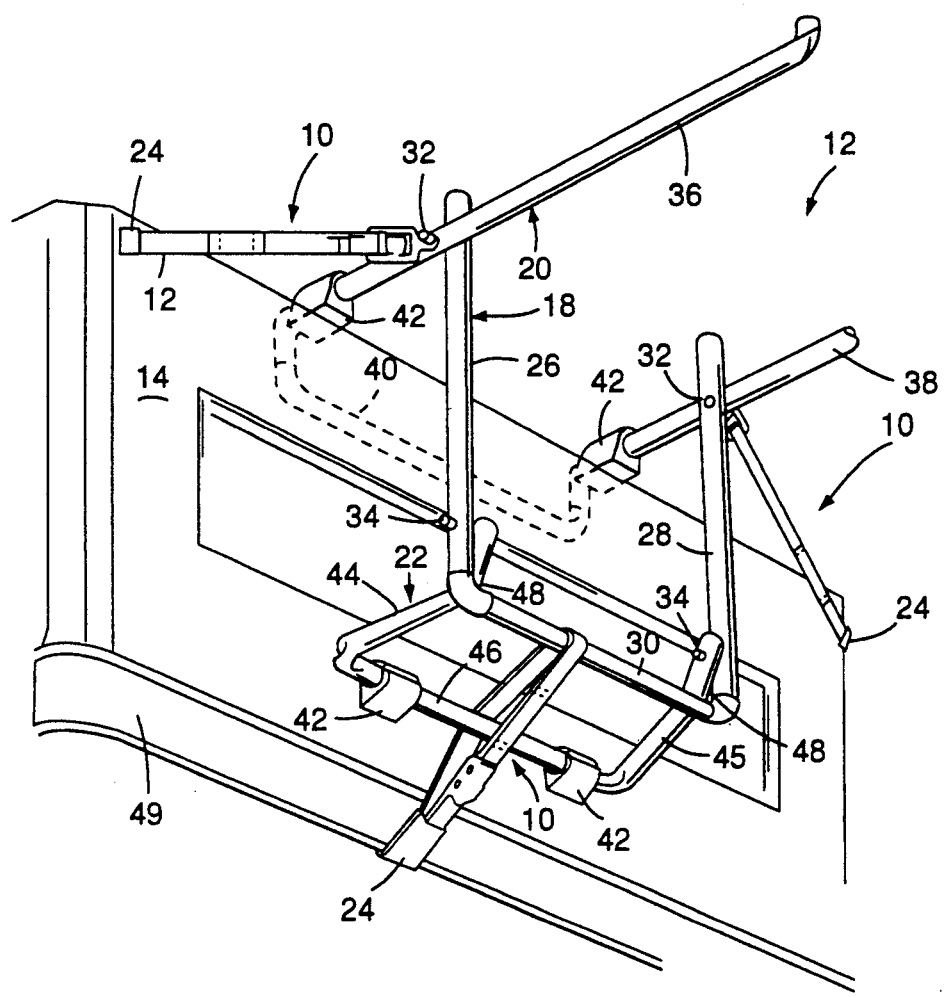
FIG. 1 is a perspective view of a mounting system embodying the invention for securing a bicycle carrier or the like on a motor vehicle.

Referring now to the drawings, particularly FIG. 1, three mounting systems 10 embodying the invention are shown for securing a carrier 12 to a motor vehicle tailgate 14. In the illustrated embodiment, by way of example, carrier 12 is a bicycle carrier for carrying one or more bicycles.

Carrier 12 includes a frame 18 having a carrying member 20 and a supporting member 22 that is rotatably mounted thereto. The carrying member 20 and supporting member 22 are constrained for limited rotational movement relative to the frame 18 between an extended carrying position and collapsed stored position. In the illustrated embodiment, two mounting systems 10 are used to hold the upper portion of the carrier 12 to the tailgate 14 using clamps 24 and a third mounting system is used to secure the carrier to a bumper 25 of the motor vehicle with a clamp 24. In an alternative embodiment, other fasteners, such as pins and bolts can also be used instead of clamps 24.

The frame 18 is a substantially U-shaped member which is composed of strong durable material, such as aluminum, steel, or polymeric composites. The frame 18 includes a pair of legs 26 and 28 that are integral with a cross member 30. The legs 26, 28 and cross member 30 are of sufficient size to provide mechanical support for the carrying member 20 and supporting member 22. Each of the legs 26 and 28 is rotatable connected to the carrying member 20 via a pin, bolt or other fastener 32 and supporting member 22 is pivotally mounted to the carrying member 20 by means of a pin, bolt or other fastener 34.

The carrying member 20 can be rotated between a carrying position shown in FIG. 1 and a stored position. In the carrying position, carrying member 20 is oriented substantially perpendicular to the frame 18. In the stored position, the carrying member and the frame 18 are substantially in side-by-side relationship. Carrying member 20 is a substantially U-shaped member formed of materials similar to that of the frame 18, preferably steel or aluminum tubing. Structurally, the carrying member 20 includes a pair of arms 36 and 38 that are integral with a front foot bar 40. A first pair of feet 42 manufactured from, for example, rubber, are typically mounted on the front foot bar 40. When the carrier 12 is mounted on a vehicle, the feet 42 help prevent scratching of the vehicle surface as a result of contact between the carrier 12 and the vehicle. As previously indicated, carrier 12 is secured to the tailgate 14 by means of mounting systems 10 which are attached to each of the arms 36 and 38 of the carrying member 20.

The supporting member 22 can be rotated to a carrying position from a stored position and also is a substantially U-shaped member formed of aluminum tubing. Supporting member 22 comprises a pair of legs 44 and 45 that are integral with a rear foot bar 46. The legs 44 and 45 are bent so as to define stop elements 48 which restrict and limit the rotational movement of the supporting member 22 relative to the frame 18. In particular, the stop elements 48 maintain the supporting member 22 substantially perpendicular to the frame 18 when the carrier 12 is in use. A pair of feet 42 are typically mounted on the rear foot bar 46. Mounting system 10 encircles both the frame 18 and the rear foot bar 46 of the supporting member 22 to hold the bottom portion of the carrier 12 against the tailgate 14. Clamp 24 is in gripping engagement with a bumper 49 of the motor vehicle. As hereinafter described, each mounting system 10 includes a strap 50 and a tension assembly 52.

Figure 2:
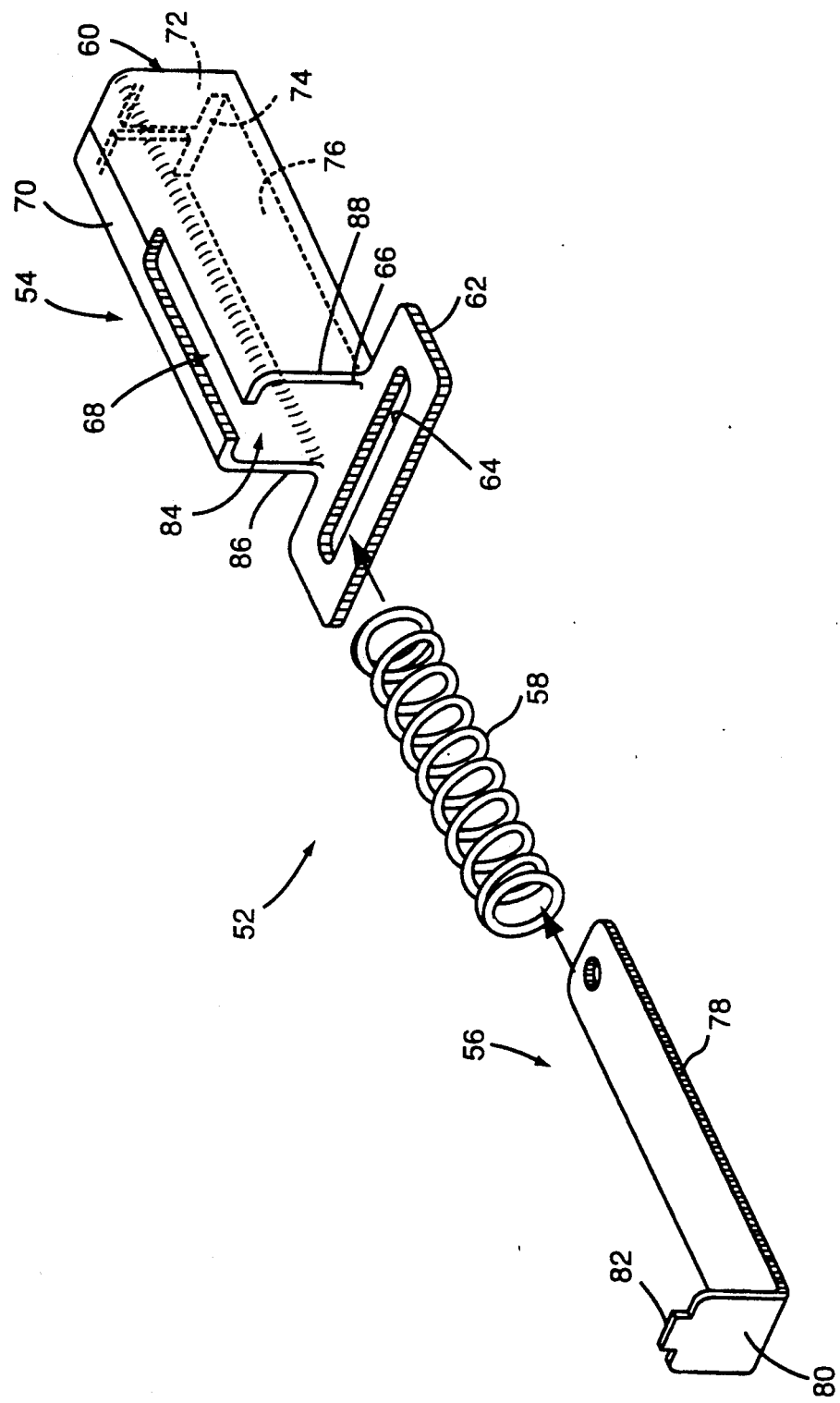
FIG. 2 is an exploded view of the mounting system of FIG. 1.

Referring now to FIG. 2, it will be seen that tension assembly 52 includes a frame 54, a slidable member 56 and a spring 58. Frame 54 includes a body 60 having a substantially rectangular profile in right cross-section and a head 62 that is formed with a slot 64. An end 66 of body 60 adjacent head 62 is opened. A guideway 68 is provided at an upper side 70 of body 60. An opposite end 72 of body 60, which is substantially closed, is formed with a substantially rectangular opening 74 at a lower side 76 of the body.

Slidable member 56 includes an elongated leg 78 that is bent at one end to form a foot 80. The free end of foot 80 is provided with a tab 82. Leg 78 is sized and shaped to be slidably received in a channel 84 that is formed by sides 70, 76, 86 and 88 of body 60. Tab 82 is sized and shaped to be slidably received within guideway 68. Leg 78 is also sized and shaped so that it is free to pass through slot 74 in body 60. Foot 80 is sized and shaped to close the opened end 66 of body 60 and retain spring 58 within channel 84 when leg 78 is inserted into channel 84 as shown in FIGS. 3 and 4. Spring 58 is a compression spring having an expanded or relaxed state and a compressed state.

In the embodiment shown in FIGS. 2 and 4, leg 78 is provided with a hole 92 through which a fastener (not shown), such as a bolt or rivet, can be inserted for attaching tension assembly 52 to strap 50 or carrier 12. In the embodiment shown in FIG. 3, a hook 90 is attached at the free end of leg 78.

In operation of tension assembly 52, strap 50 is attached to head 62 for example, by looping the strap through slot 64 and stitching the loop closed as shown at 94. When tension assembly 52 is connected to carrier 12, strap 50 is tightened so that foot 80 is pulled toward the closed end of body 60. As foot 80 moves toward the closed end of body 60, spring 58 is compressed. When carrier 12 is jarred, strap 50 may tend to become slack. However, compression spring 58 expands and compensates for any slackness in strap 50. Accordingly, tension is maintained on the strap 50 and carrier 12 remains securely fastened to the motor vehicle. Spring 58 is selected to provide the appropriate force to permit the spring to be compressed by the tightening of strap 50 and, at the same time, be sufficiently strong to maintain the tension on strap 50 during jarring of carrier 12.

Figure 5:
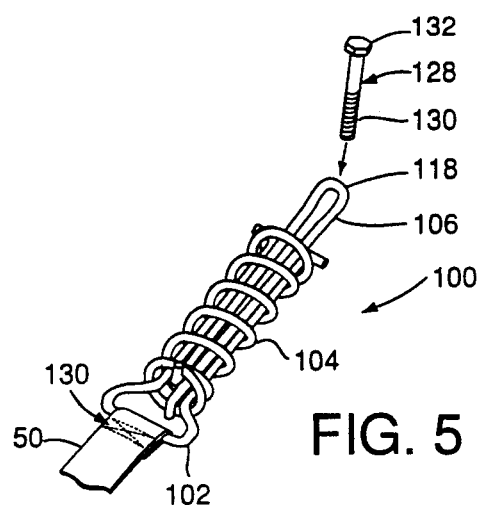
FIG. 5 is a perspective view of an alternative embodiment of a mounting system embodying the invention.
Figure 6A:
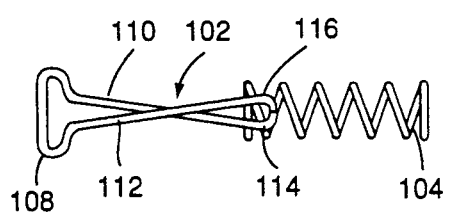
FIGS. 6A, 6B and 6C are perspective views showing progressive steps in the fabrication of the mounting system shown in FIG. 5.
Figures 6B, 6C:
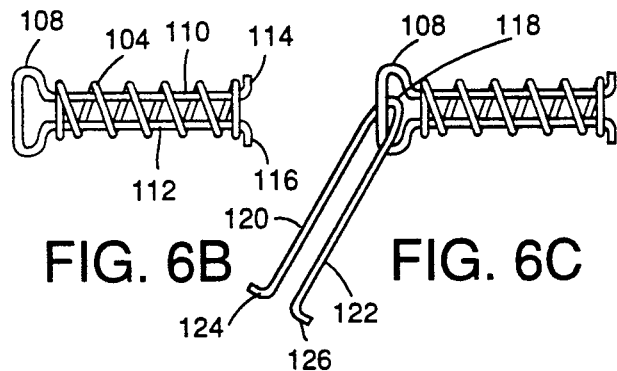

Referring now to FIGS. 5, 6A–6C, there is shown a tension assembly 100 which is an alternate embodiment of tension assembly 52. Tension assembly 100 comprises a frame 102, a spring 104 and a slidable member 106. As best shown in FIG. 6A, frame 102 includes an enlarged head 108 and a pair of legs 110,112 that are turned outwardly at their ends into feet 114,116, respectively. Frame 102 is composed of a spring-like material so that legs 110 and 112 can be squeezed together and inserted into spring 104. When the legs 110,112 are released, spring 104 is captively held between head 108 and feet 114,116 as shown in FIG. 6B. Slidable member 106 is a substantially U-shaped member having a top portion 118 and side members 120 and 122. The side members 120 and 122 are bent outwardly at their ends into stop 124 and 126, respectfully.

In the assembly of tension assembly 100, frame 102 is inserted into spring 104 as shown in FIGS. 6A and 6B. Next, slidable member 106 is slipped over head 108 as shown in FIG. 6C. Then, top portion 118 is fed through spring 104 until the top portion exits one end of the spring and stops 124,126 strike the other end of the spring as shown in FIG. 5. Side members 120 and 122 are spaced apart so that they are freely received within spring 104, for example, a compression spring that will compress when strap 50 is tightened and maintain tension on the strap during jarring of the carrier 12. Stops 124 and 126 are spaced apart so that they engage the end of spring 104 and prevent further movement of slidable member 106. A fastener 128, for example, a pin 130 with an enlarged head 132, is provided for attaching tension assembly 100 to a strap 50 or carrier 12. In addition, when fastener 128, is inserted between side members 120, 122 and the end of spring 104, it prevents frame 104 from slipping out of the spring. Although not shown, a hook could be used to attach tension assembly 100 rather than pin 130.

In operation of tension assembly 100, strap 50 is attached to head 108 for example, by looping and stitching the strap as shown at 130 in FIG. 5. When tension assembly 100 is connected to carrier 12, strap 50 is tightened so that head 108 of frame 102 and top portion 118 of slidable member are pulled apart and feet 114, 116 are pulled toward stops 124,126. Spring 104 is compressed between feet 114, 116 and stops 124,126. Strap 50 is under tension and is maintained under tension by spring 104 which is being held in a compressed state. When carrier 12 is jarred, strap 50 tends to become slack. However, under this condition, compression spring 104 expands to compensate for any slackness in strap 50 and maintains tension on the strap. That is, tension is provided by a compression means. In the alternative embodiments shown in FIGS. 7, 8 and 9, tension is provided by a tensioning means rather than a compression means.

Figure 7:
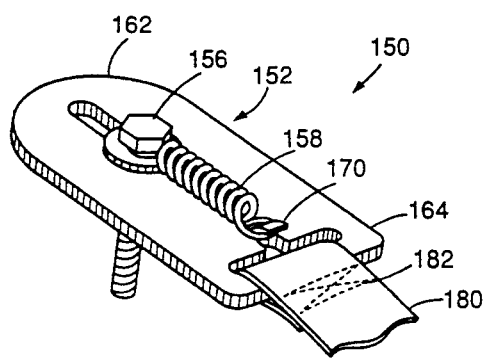
FIG. 7 is a perspective view of an alternative embodiment of the mounting system with the tension means in its compressed or relaxed state.
Figure 8:
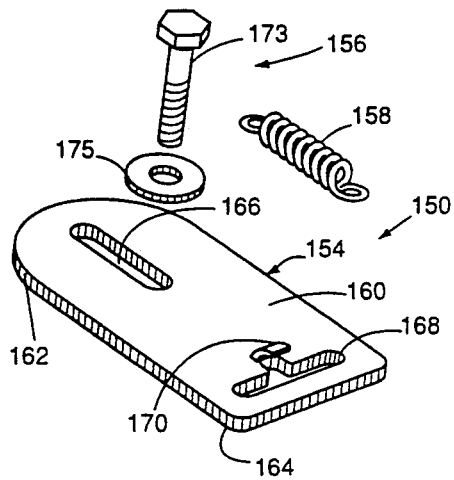
FIG. 8 is an exploded view of the mounting system of FIG. 7.

Referring now to FIGS. 7 and 8, there is shown a mounting system 150 having a tension assembly 152 that includes a frame 154, a slidable member 156 and a tension spring 158. Frame 154 includes a body 160 having a substantially rectangular profile that is rounded at a head end 162 and straight at a foot end 164. A longitudinal slot or guideway 166 is provided at head end 162 and a T-slot 168 with a tab 170 is provided at foot end 164.

In FIGS. 7 and 8, slidable member 156 is a fastener, for example a bolt 173 with a washer 175, the bolt being used to hold one end of spring 158 and to secure mounting system 150 to the carrier 12. It is to be noted that the upper portion of bolt 173 is not threaded so that the bolt is free to slide in guideway 166 when mounting system 150 is secured to the carrier 12.

Figure 9:
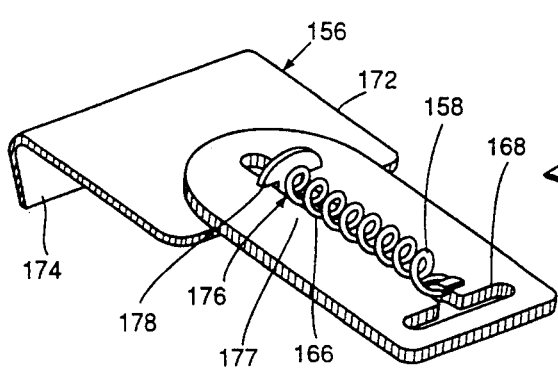
FIG. 9 is a perspective view of the mounting system of FIG. 7 with the tension means in an expanded or tensioned state.

In the embodiment shown in FIG. 9, a slidable member 156' includes a rectangular member 172 that is bent at one end to form a foot or hook 174. Hook 174 is used to attach mounting system 150 to an automobile trunk lid or bumper, for example. The other end of member 172 is provided with a tab 176 having a narrow body 177 and an enlarged head 178. Body 177 is sized and shaped to be slidably received within guideway 166 and to secure one end of spring 158. Enlarged head 178 is sized and shaped to retain body 176 in slot 166 and to hold spring 158 on body 176. That is, enlarged head 178 is thin enough so that it can fit through slot 166 when member 172 is turned perpendicular to frame 154 and wide enough so that the head will not fit through slot 166 when member 172 and frame 154 are aligned as shown in FIG. 9. Spring 58 is a tension spring having a stretched or extended state and a relaxed or contracted state.

In operation of tension assembly 152, a strap 180 is attached to frame 154, for example, by looping the strap through slot 168 and stitching the loop closed as shown at 182. When tension assembly 152 is connected to carrier 12, strap 180 is tightened so that slidable member 156 is pulled toward the head end 162. As slidable member 156 moves toward the head end 162, spring 58 is stretched and under tension. When carrier 12 is jarred, strap 180 may tend to become slack, however, tension spring 158 contracts and compensates for any slackness in the strap. Accordingly, tension is maintained on the strap 180 and carrier 12 remains securely fastened to the motor vehicle. Spring 158 is selected to provide the appropriate tension force to permit the spring to be stretched by the tightening of strap 180 and, at the same time, be sufficiently strong to maintain the tension on strap 180 during jarring of carrier 12.

Figure 10:
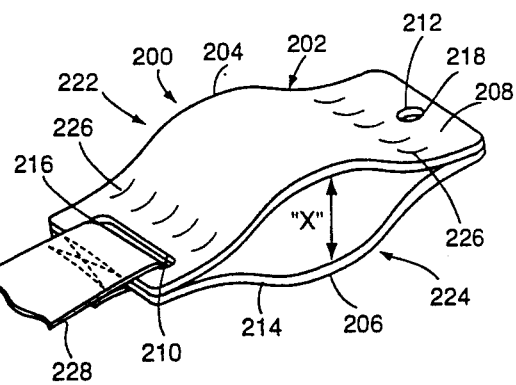
FIG. 10 is a perspective view of a further embodiment of the mounting system.

Referring now to FIG. 10, there is shown a mounting system 200 which is an alternate embodiment of mounting system 150. Mounting system 200 includes a tension assembly 202 which includes a pair of spring members 204, 206. Member 204 includes a substantially rectangular body 208 having a slot 210 at one end and a hole 212 at the other end. In the illustrated embodiment, member 206 is a mirror image of member 204 and includes a substantially rectangular body 214 having a slot 216 at one end and a hole 218 at the other end. Members 204 and 206 are composed of a spring material, each member being bowed outwardly at intermediate sections 222, and 224, respectively. Members 204 and 206 are held together by welding, for example, as shown at 226. It is to be understood that, in alternate embodiments, members 204 and 206 are held together by means other than welding, for example rivets. When attached, slots 210, 216 and holes 212, 218 are aligned. Slots 210,216 are provided for attachment of a strap 228 and holes 212, 218 are provided for attaching mounting system 200 to the carrier 12. Members 204, 206 are composed of a spring material which is sufficiently flexible to permit the members 204, 206 to be squeezed together or become somewhat flat when mounting system 200 is in tension and sufficiently strong to maintain tension on the strap 228. When mounting system 200 is in an untensioned state as shown in FIG. 10, members 204 and 206 are separated by a distance "x". When mounting system 200 is in its tensioned state, the bowed surfaces of members 204 and 206 are urged towards one another and become somewhat flat. When carrier 12 is jarred, strap 228 may tend to become slack. However, in such a case, the somewhat flat members 204 and 206 tend to revert to their bowed condition and maintain tension on strap 228.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A tension assembly for securing a carrier to a motor vehicle, said tension assembly comprising:
   a securing means, said securing means being attachable to, and detachable from, the carrier and motor vehicle and providing a means for securing said tension assembly between the carrier and the motor vehicle, said securing means including a first member and a second member, said first member and said second member interconnected for slidable movement relative to each other, said first member having a body including a first opened end and a second closed end, said first opened end of said body having an integral head for attaching said body to one of either the carrier or the motor vehicle, said first opened end being continuous with a guideway channel oriented substantially parallel to an longitudinal axis of said body, an opening being formed in said second end of said body, said second member having an elongated leg that is bent at one end to form a foot, said foot including a tab sized and shaped to be slidable on and along said guideway channel in said body, an opposite end of said leg having means for attaching said leg to the other of either the carrier or the motor vehicle, said leg slidably received in said body, said leg sized and shaped to pass freely in said opening formed in said second end of said body, said tab of said foot limiting movement of said leg in said body, and a tension means, said tension means being held between said second closed end of said body of said first member of said securing means and said foot of said second member of said securing means, said tension means having expanded and contracted states, said tension means being in tension when contracted, whereby said tension assembly is under tension when said tension means is in tension, said tension assembly securely mounting the carrier to the motor vehicle when said tension assembly is under tension, said tension assembly operative to secure under tension the carrier to the motor vehicle.

2. The tension assembly as claimed in claim 1 wherein said tension means is compression means having an expanded state and a compressed state, said compression means engaged by said first member and said second member in such a manner that when said first and second members are moved in a first direction relative to one another said compression means is compressed and said securing means is under tension, when said first and second members are moved in an opposite direction, said compression means expands to maintain tension on said securing means.

3. The tension assembly as claimed in claim 2 wherein said compression means is a compression spring.

4. A tension assembly for securing a carrier to a motor vehicle, said tension assembly comprising:

securing means and tension means, said securing means attachable to the carrier and motor vehicle for securing said tension assembly between the carrier and the motor vehicle, said securing means including a first member and a second member, said first member and said second member interconnected for slidable movement relative to each other, said first member having a body that is opened at one end and closed at an opposite end, said opened end of said body having an integral head for attaching said body to one of the carrier and motor vehicle, an opening formed in said opposite end of said body, said second member having an elongated leg that is bent at one end to form a foot, an opposite end of said leg having means for attaching said leg to the other of the carrier and motor vehicle, said leg slidably received in said body, said leg sized and shaped to pass freely in said opening formed in said opposite end of said body, said foot limiting movement of said leg in said body, a guideway formed in said body, said foot including a tab that is sized and shaped to be slidably received in said guideway, said body being a sheet that is folded into a substantially rectangular shape in right cross section, the sides of said body forming a channel, said leg sized and shaped to be slidably received in said channel, said guideway for said tab formed in one of said sides of said body, said tension means being held between said closed end of said body and said foot, said head being formed in another one of said sides of said body, said guideway formed in a side of said body opposite said side in which said head is formed, said tension means having expanded and contracted states, said tension means being in tension when contracted, said tension assembly being under tension when said tension means is in tension, said tension means securely mounting the carrier to the motor vehicle when said tension assembly is under tension, said tension means operative to secure under tension the carrier to the motor vehicle.

* * * * *